R. J. GOADE.
FILTER.
APPLICATION FILED SEPT. 30, 1908.
932,696.
Patented Aug. 31, 1909.
2 SHEETS—SHEET 2.
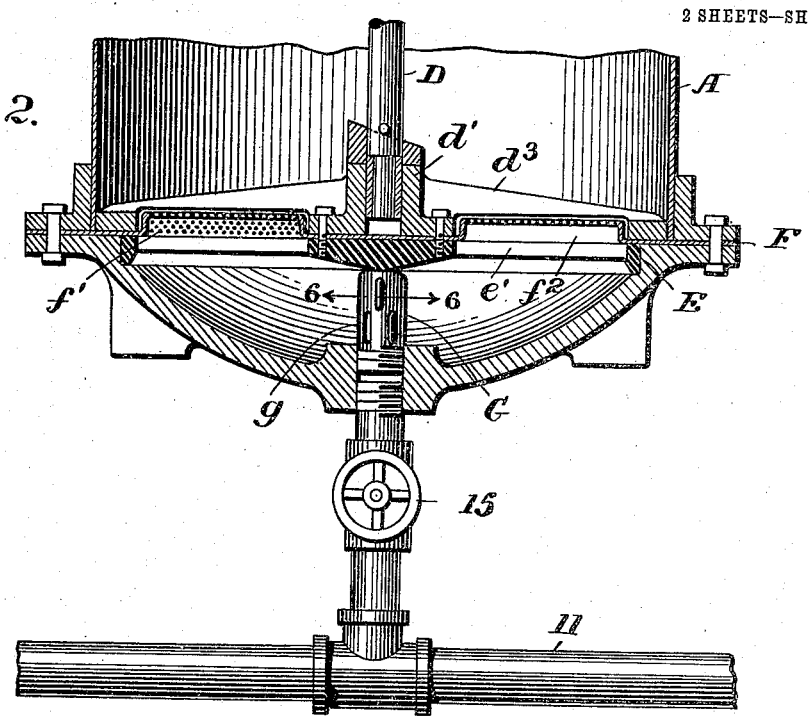
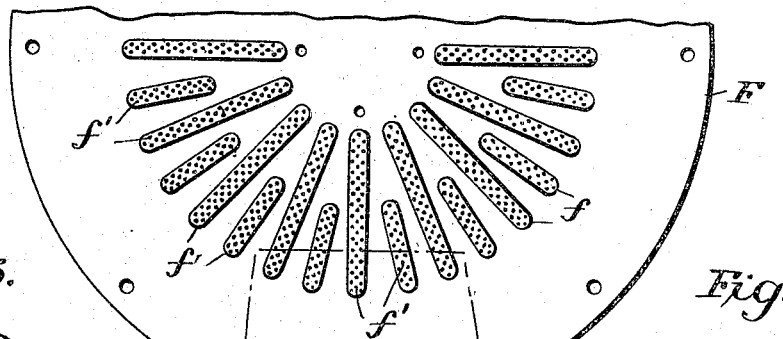
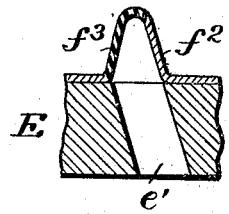
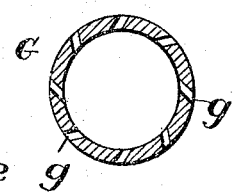
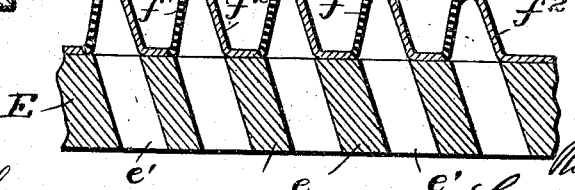
Witnesses
J. G. Stinkel
J. J. McCarthy
Inventor:
Richard J. Goade,
by Spencer B. Pentin,
Attorney

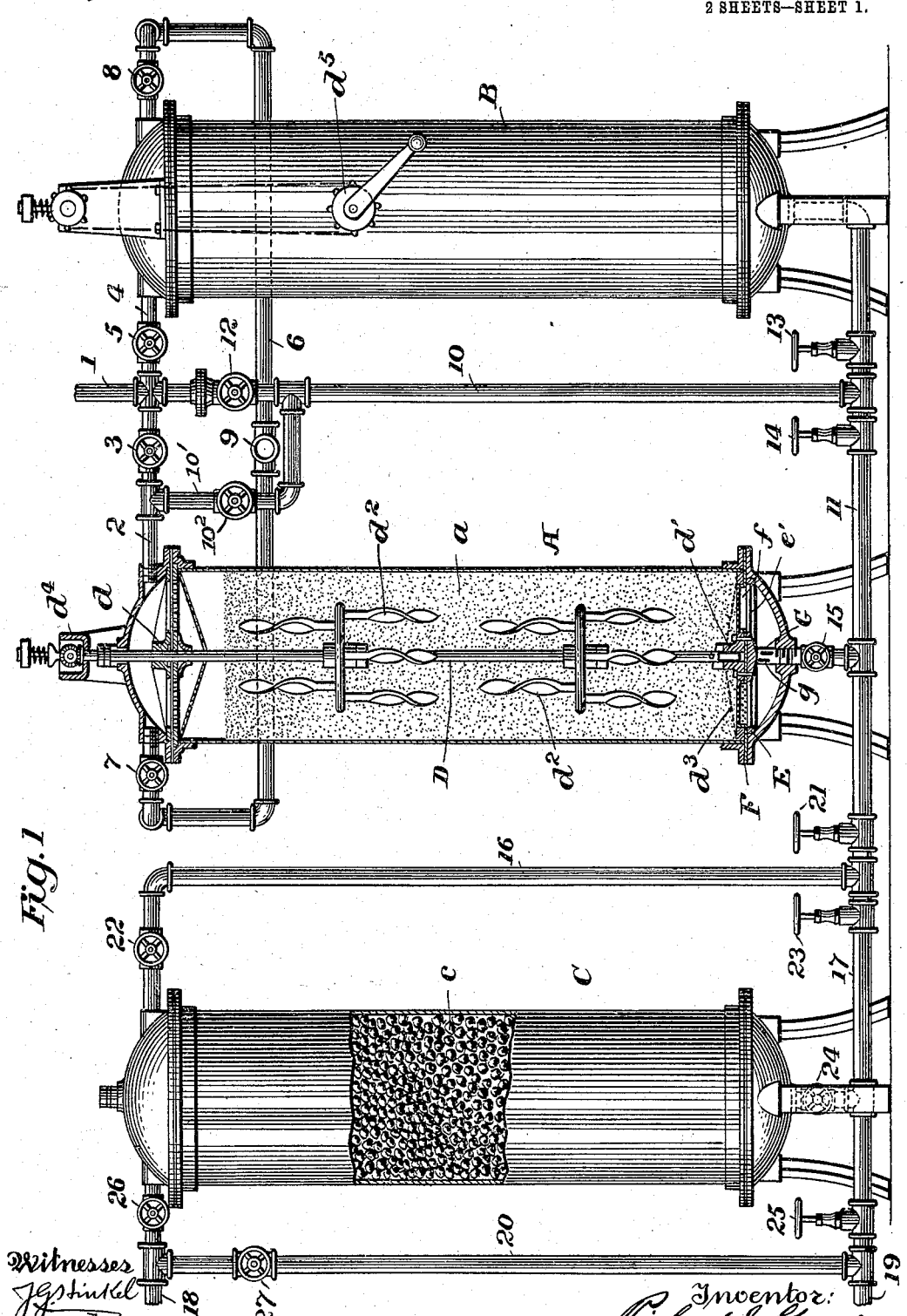

UNITED STATES PATENT OFFICE.

RICHARD J. GOADE, OF ALLENTOWN, PENNSYLVANIA.

FILTER.

932,696.           Specification of Letters Patent.    Patented Aug. 31, 1909.

Application filed September 30, 1908. Serial No. 455,478.

*To all whom it may concern:*

Be it known that I, RICHARD J. GOADE, a citizen of the United States, residing at Allentown, in the county of Lehigh and State of Pennsylvania, have invented certain new and useful Improvements in Filters, of which the following is a specification.

My invention relates to granular bed filters and to the treatment of feed water for steam boilers. Its objects are to improve the circulation of the reverse flow through the filter chamber or chambers, thereby effecting a more thorough cleansing of the filtering medium; to provide greater facility in connecting the various chambers of a compound filter for filtration and cleansing; to provide a combined plant for filtering feed water and treating it to prevent incrustation of the steam boiler; and to improve the circulation of the feed water through the treatment chamber or tank.

With these and other objects in view, the invention consists in providing an inlet nozzle for admitting a reverse or cleansing flow to the granular filtering medium and so constructed as to produce a rotary or whirling motion of the water, combined with a support for the filtering medium constructed to continue this rotary flow into said filtering medium.

The invention further consists in the double or compound filter hereinafter described; in the combined feed water filtering and treating plant, and in the various novel features and details of construction hereinafter set forth, and shown in the accompanying drawings in which—

Figure 1 is a general view showing a preferred embodiment of the invention, one of the filtering chambers being in section to show the interior construction of both, the lower portion of the treating chamber or tank for supporting the treating material being preferably the same as that of the filtering chambers and a portion of said tank being broken away, to show said material; Fig. 2 is an enlarged view in vertical section of the bottom of a filtering chamber; Fig. 3 is an enlarged plan view of the supporting plate for the granular filtering material and the treating material, a portion of said plate being broken away; Fig. 4 is a view of the supporting plate and grate in section taken on line 4—4, Fig. 3; Fig. 5 shows in section a slight modification of the plate perforations; and Fig. 6 is a horizontal section through one of the distributing nozzles, taken on line 6—6, Fig. 2.

Referring to the drawings, A and B are two granular bed filtering chambers, which are shown as substantially of the same construction set forth in my prior patent No. 713,759, granted November 18, 1902, for which reference is made for a more detailed description of the general features than that contained herein. As the two filters are similar a brief description of one will suffice for both.

The filtering chamber A contains a granular filtering material, or bed, $a$, and an agitator shaft D mounted in bearings $d$ $d^1$ carried by spiders $d^3$ suitably secured to the shell. Upon shaft D is mounted an agitator $d^2$ for the filter bed. Bevel gears $d^4$, and crank and chain mechanism $d^5$, are provided for rotating the agitators while cleansing the granular bed. For a detailed description of these features reference may be had to my above-mentioned patent, and it will be understood that for the purpose of the present invention these features may be varied and in some cases the agitators altogether omitted.

The filtering material is carried by a grate E fitted in the bottom of the filtering chamber. This grate is preferably a casting in which the bars $e$ extend radially toward the circumference and are so formed as to provide oblique channels $e^1$ all sloping so as to cause or assist a rotary motion of the water passing upward through it and entering the filtering chamber. The angle of slant of these bars and channels is optional and may be varied according to the amount of flow and rotary motion desired.

Overlying grate E is a perforated plate F, preferably of copper, formed with fluted ridges $f$ extending radially and arranged to register with oblique channels $e^1$. One side and the upper surface of each of these ridges $f$ extends over its oblique channel $e^1$ of the grate and are provided with perforations $f^1$, while the other side $f^2$ of each ridge has a slope substantially the same as, and forms an extension of, the side of the grate bar, and is preferably left solid as shown in Fig. 4. By this construction the upward flow of water is projected into the filtering chamber only in the proper direction to cause a rotary motion within the chamber.

Instead of making perforations $f^1$ perpendicular to the face of the metal, they may be made obliquely, as shown at $f^3$ in Fig. 5, so as to extend exactly in the line of motion of the water passing upward through channels $e^1$.

In order to give the upward flow of water an initial rotary motion before it reaches the grate bars, I provide at the bottom of the chamber an injecting nozzle G having lateral slots or orifices $g$ arranged on a slant to the radius, so as to discharge in a direction between the radial and tangential and give the water in the space below the grate a rotary motion in the same direction as it will have when passing through the grate and perforated plate.

A supply pipe 1 is connected by pipe 2, having valve 3, with the top of filtering chamber A; and by pipe 4, having valve 5, with the top of chamber B. The top of each chamber is connected by pipe 6, having valves 7 and 8, with waste opening 9. Pipe 10 connects supply pipe 1 with pipe 11 extending to injecting nozzles G, and each having valves 12, 13 and 14, as shown. The flow to nozzle G of chamber A is controlled by valve 15.

A by-pass 10′, provided with valve $10^2$, connects pipe 10 below valve 12 with pipe 2 leading to the top of chamber A.

When the filter is employed for the purpose of treating the feed water of steam boilers, I combine with it a chamber or tank C similar to chambers A and B and preferably having the same construction of grate and perforated plate as a support for broken soapstone $c$. The action of this is to supply a film of finely divided soapstone to the inner surface of the boiler to prevent incrustation, and as the pulsations of the injector pump serve to sufficiently agitate the particles of stone to keep up the supply, the mechanical agitator is omitted. Both the top and bottom of this chamber C are connected to pipe 11 by pipes 16 and 17, and outlet pipes 18 and 19, bridged by pipe 20, are provided leading to the injector pump (not shown). The connections to and from chamber C are controlled by valves 21, 22, 23, 24, 25, 26, and 27, as shown.

Assuming all the valves to be closed, the various operations effected by manipulating the controlling valves of the plant may be described as follows. In order to supply feed water to a boiler through the filter chambers in series, valves 5, 13, $10^2$, 15, 21, 23, 24 and 26 are opened, when water will flow from pipe 1 through said valves and their pipes and downward through the filter beds in series, upward through chamber C containing the soapstone, and out at pipe 18 to the feed pump. If desired, the flow through chamber C in a downward direction may be caused by closing valves 23 and 26, and opening valves 22, 25 and 27. If it be desired to cut out chamber C altogether, valves 23 and 25 are opened, the others controlling chamber C being closed, when the discharge will be at pipe 19. For a more rapid flow of filtered water, a flow through chambers A and B in parallel is effected by opening valves 5, 13, 14, and 3, 15 and 21.

In order to cleanse chamber A with filtered water from chamber B, valves 5, 13, 14, 15 and 7 are opened, when the flow will be downward through filter B and upward through nozzle G of filter A with a rotary motion through channels $c^1$ of the grate and perforations $f^1$ of plate F into chamber A. If agitators are employed, these are then rotated in combination with the rotary upward flow of water, thereby thoroughly cleansing the granular bed of chamber A. Any caking or "mounding" of the filtering material against the sides or shell of the chamber, which would reduce the efficiency of the filter, is effectually prevented by the rotary or whirling motion of the reverse flow from nozzle G and through the perforations of plate F, especially in filters where no mechanical agitator is employed. In the same manner the bed of chamber B may be cleansed with filtered water from chamber A. Moreover, should either become disabled or require attention or repairs, it may be cut out of service and filtration through the other filter continued uninterruptedly by manipulating the proper valves, as will readily appear.

My filter is well adapted for supplying filtered water to dwellings, office buildings and hotels, as well as for use in a combination plant for the treatment of steam boiler feed water.

Having described my invention, what I claim as new and desire to secure by Letters Patent of the United States is—

1. In a filter, the combination with a filtering chamber containing filtering material, of a rotary agitator for said material within said chamber, a nozzle arranged to supply a reverse rotary flow to said chamber, and a diaphragm above said nozzle arranged to support said material and provided with perforations which admit said fluid in the direction of its rotation and that of said agitator to said material.

2. In a filter, the combination with a filtering chamber designed to contain granular filtering material, of a nozzle arranged to supply a reverse rotary flow to said chamber, and a diaphragm above said nozzle arranged to support said material and provided with perforations which admit said fluid in the direction of its rotation to said material.

3. In a filter, the combination with a filtering chamber designed to contain granular filtering material, of a grate for supporting said material and formed with oblique channels inclined in such manner as to admit an upward rotary flow to said material.

4. In a filter, the combination with a filtering chamber designed to contain granular filtering material, of a grate for supporting said material and formed with oblique channels inclined in such manner as to admit an upward rotary flow to said material, and a plate overlying said grate having corrugations to register with said channels and perforations in continuation of said channels.

5. In a filter, the combination with a filtering chamber designed to contain granular filtering material, of a nozzle arranged to supply a reverse rotary flow to said chamber, a grate for supporting said material and formed with oblique channels inclined in such manner as to admit an upward rotary flow to said material, and a plate having corrugations to register with said channels and perforations in continuation of said channels.

6. In a filter, the combination with a filtering chamber designed to contain granular filtering material, of a grate for supporting said material and formed with radial oblique-sided channels to admit an upward rotary flow to said material.

In testimony whereof I have affixed my signature, in presence of two witnesses.

RICHARD J. GOADE.

Witnesses:
JACOB S. RENINGER,
JAMES J. GILLESPIE.